Feb. 28, 1939.  J. T. ATWOOD  2,148,674
DOOR CHECK
Filed July 14, 1938
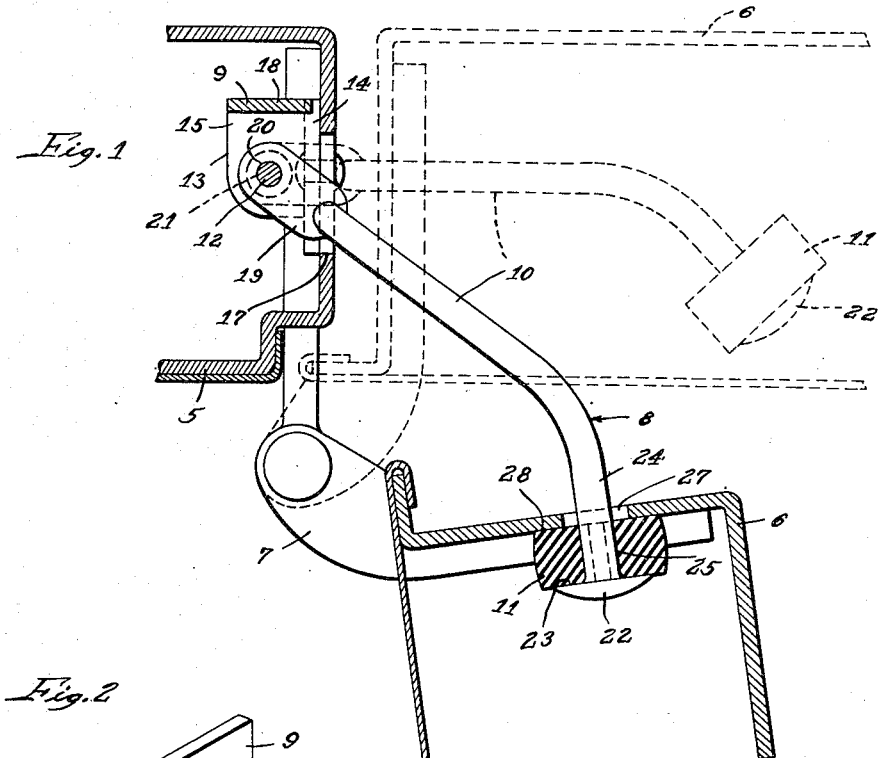
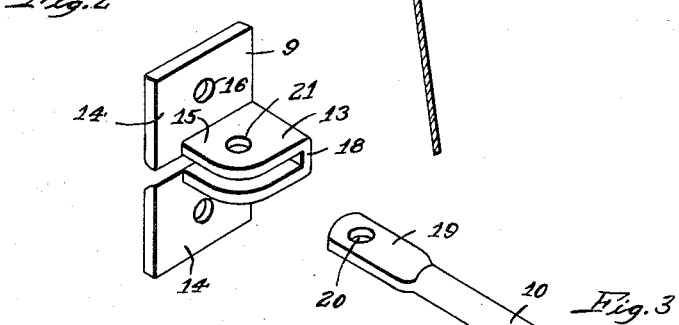
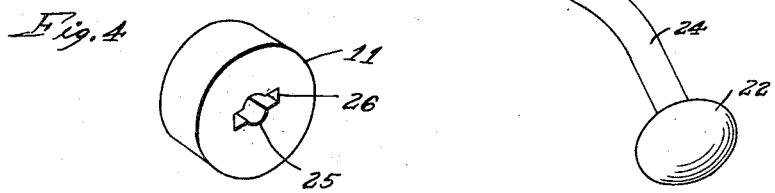
Inventor:
James T. Atwood
By
McCanna, Wintercorn & Morsbach
Attys.

Patented Feb. 28, 1939

2,148,674

UNITED STATES PATENT OFFICE 2,148,674

DOOR CHECK

James T. Atwood, Rockford, Ill.

Application July 14, 1938, Serial No. 219,133

3 Claims. (Cl. 16—86)

This invention relates to door checks and is principally concerned with one designed for use on the doors of motor vehicles.

The door check of my invention is of that type designed to work through an opening in the door pillar and pivoted at one end on the pillar and equipped with a rubber bumper or cushion block at the other end to check the opening movement of the door. I am aware that various means have been provided for pivoting such door checks and securing the rubber block on the end of the check arm but in most cases the constructions have either been too complicated and costly or were unsatisfactory for other reasons. It is, therefore, the principal object of my invention to provide a door check of simple and inexpensive but durable construction and designed for easy installation and so as to present a neat appearance when installed on the car.

The invention is illustrated in the accompanying drawing, in which—

Figure 1 is a horizontal sectional view through adjoining portions of a motor vehicle door and pillar showing a door check made in accordance with my invention, the same appearing in full lines in the open position of the door and in dotted lines in the dotted line closed position thereof; and Figs. 2, 3, and 4 are perspective views of the one-piece pillar bracket, the check arm and the rubber bumper block, respectively.

The same reference numerals are applied to corresponding parts throughout the views.

Referring to Fig. 1, 5 designates the door pillar on the body of an automobile or other motor vehicle, and 6 designates the door hinged on the pillar as indicated at 7, but, of course, insofar as my invention is concerned the door check indicated generally by the numeral 8 will work equally satisfactory if 6 is the relatively stationary part and 5 is the relatively hinged part. The door check of my invention is much simpler than most that have come to my attention and is made up of only four parts: the one-piece pillar bracket 9, the one-piece check arm 10, the rubber bumper block 11, and the pivot pin or rivet 12 for pivoting the arm 10 on the bracket 9. Bracket 9 is preferably formed from stamped sheet metal to provide a U-shaped body portion 13 having attaching ears 14 on the two flanges 15 thereof which may be perforated, as indicated at 16, to receive bolts or rivets for fastening the same to the wall of the pillar 5, although in most cases the bracket 9 will be inserted through a rectangular hole 17 of proper size and then located properly on the inside of the pillar and welded in place. The web 18 between the two flanges 15 spaces the same and prevents binding of the flattened end 19 of the check arm 10 therebetween, such as would otherwise be quite apt to occur if the flanges 15 were provided on separate pieces not positively located and spaced with respect to one another. The check arm 10 is made from round rod material flattened at the end 19 to provide an attaching ear that will fit neatly between the flanges 15 of the bracket 9, the ear being provided with a hole 20 adapted to register with holes 21 in the flanges 15 to receive the pin or rivet 12, which pivotally connects the arm 10 to the bracket 9. The other end of the rod from which the check arm 10 is made is upset to provide a round head 22 with a flat face 23 normal to the axis of the bent outer end 24 of the arm providing a broad support annularly with respect to and integrally connected all around with the end 24 of the arm, as best appears in Fig. 1. This support is for the rubber bumper block 11 which, as clearly appears in Fig. 4, is of cylindrical form and has a central axial hole 25 therethrough for a snug fit on the outer end of the arm 10. Longitudinal slots 26 are provided on diametrically opposite sides of the hole 25 in the block 11 giving the hole a keyhole shape to permit passage of the flattened end 19 of the check arm 10 through the hole in the block. The hole 25 is, of course, slightly smaller in diameter than the rod used in making the check arm, so that the block 11 will be held frictionally in its operative position next to the headed end 22 of the arm. A hole 27 is provided in the side wall of the door 6 in approximate registration with the hole 17 in the pillar 5 for extension of the check arm 10 into the door and, of course, this hole is small enough to leave ample bearing surface 28 around it on the inside of the wall of the door for abutment with the bumper block 11 when the door is swung open, as shown in full lines in Fig. 1. When the door is closed, as shown in dotted lines in Fig. 1, the arm 10 occupies the dotted line position shown, with the bumper block 11 disposed in engagement with the headed end 22 thereof.

It is believed to be evident from this description that I have provided a door check of unusually practical and serviceable design and one which by reason of its few parts, all of simple and economical construction, can be produced in quantities at a fraction of the cost involved in other constructions. This device can, furthermore, be assembled on the car with much greater ease and facility than others with which I am familiar, and once the bracket 9 has been welded or otherwise secured in place the check arm 10 is found to work freely in every instance. The one-piece construction of the bracket insures easy operation of the arm and prevents binding of the flanges 15 on the flattened end 19 of the arm. There is eliminated the annoyance of having to re-work and reset the door check due to some distortion in the door or body occasioned while it is going along the assembly line. The one-piece construction of the check arm with its integral headed end providing a solid abutment for the bumper block is also of distinct advantage because once the door check is assembled on the car there is definite assurance of its always functioning properly, whereas, with certain other designs where the bumper block is backed up by a detachable member threaded or otherwise secured in place, there is always the danger of that part coming off. With the present construction there is also the advantage that the bumper block is of one-piece construction and is subjected to simple compression so that it will last indefinitely, whereas, in certain other designs the bumper block was subjected to stresses and strains certain to cause its disintegration in a short time.

I claim:

1. In a door check for a vehicle door comprising an arm having one end adapted to be pivotally connected to the stationary pillar and the other end provided with an integral head and adapted to extend through an opening in the movable pillar, the combination of a rubber bumper block having a longitudinal opening provided therein of such a diameter in relation to the diameter of the arm to permit slippage of the block along the arm into position in abutment with the head and so that said block is thereafter retained in such position by frictional engagement with the arm, said head having a flat face provided thereon annularly with respect to and all the way around the end of the arm and in a plane normal thereto for abutment with a flat face provided on the adjacent side of the bumper block annularly with respect to and all the way around the opening, and said block having a flat face on the other side thereof substantially parallel to the flat face last named annularly with respect to and all the way around the opening for abutment with a flat surface on the movable pillar adjacent the opening therein.

2. In a door check for a vehicle door comprising an arm having one end provided with a flattened enlarged attaching portion adapted to be pivotally connected to the stationary pillar and the other end provided with an integral head adapted to be extended through an opening in the movable pillar, the combination of a rubber bumper block having a longitudinal keyhole shaped opening provided therein the central approximately circular part of which approximates the diameter of the intermediate portion of the arm whereby to permit slippage of the block along the arm into abutment with the headed end and so that said block is retained in such assembled position by frictional engagement with the arm, the rest of the longitudinal keyhole shaped opening in the bumper block being conformed so as to permit extension therethrough of the enlarged flattened attaching end portion of the arm, said head having a flat face provided thereon annularly with respect to and all the way around the end of the arm and in a plane normal thereto for abutment with a flat face provided on the adjacent side of the bumper block annularly with respect to and all the way around the keyhole shaped opening, and said block having a flat face on the other side thereof substantially parallel to the flat face last named annularly with respect to and all the way around the opening for abutment with a flat surface on the movable pillar adjacent the opening therein.

3. As an article of manufacture, a one-piece door check arm adapted to be pivotally attached at one end to one of a pair of relatively movable companion door pillars and to have abutment at its other end with the other of said pillars, the said arm comprising a rod one end of which is upset to provide an integral head having a flat inner face annularly with respect to and all the way around the end of the rod adapted to have abutment with a pillar engaging bumper block through which the rod is adapted to extend, and the other end of said rod being adapted, when perforated, to be pivotally attached to a door pillar.

JAMES T. ATWOOD.